(12) United States Patent
Kamiya

(10) Patent No.: US 8,989,454 B2
(45) Date of Patent: Mar. 24, 2015

(54) SALES DATA PROCESSING APPARATUS AND COMPUTER-READABLE STORAGE MEDIUM

(75) Inventor: Mitsuharu Kamiya, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 232 days.

(21) Appl. No.: 13/524,005

(22) Filed: Jun. 15, 2012

(65) Prior Publication Data

US 2012/0321147 A1 Dec. 20, 2012

(30) Foreign Application Priority Data

Jun. 17, 2011 (JP) .................................. 2011-134721

(51) Int. Cl.
*G06K 9/00* (2006.01)
*G06Q 30/06* (2012.01)
*G07G 1/00* (2006.01)
*G07G 1/12* (2006.01)
*G06Q 20/38* (2012.01)
*G06Q 30/02* (2012.01)

(52) U.S. Cl.
CPC .............. *G06Q 30/06* (2013.01); *G07G 1/0018* (2013.01); *G07G 1/12* (2013.01); *G06Q 20/389* (2013.01); *G06Q 30/0207* (2013.01)
USPC ....................................................... 382/118

(58) Field of Classification Search
USPC ......................................................... 382/118
See application file for complete search history.

(56) References Cited

U.S. PATENT DOCUMENTS

| | | | |
|---|---|---|---|
| 2004/0078260 A1* | 4/2004 | Milgramm et al. | ............. 705/10 |
| 2009/0060295 A1 | 3/2009 | Inoue et al. | |
| 2009/0268028 A1* | 10/2009 | Ikumi et al. | ................... 348/150 |
| 2011/0063108 A1* | 3/2011 | Aonuma et al. | ............. 340/540 |
| 2011/0176005 A1 | 7/2011 | Kaneko | |
| 2012/0201468 A1 | 8/2012 | Oami et al. | |
| 2012/0321146 A1* | 12/2012 | Kundu et al. | ................. 382/118 |

FOREIGN PATENT DOCUMENTS

| | | |
|---|---|---|
| JP | 2001-325433 | 11/2001 |
| JP | 2003-296817 | 10/2003 |
| JP | 2005-115504 | 4/2005 |
| JP | 2007-249588 | 9/2007 |
| JP | 2010-061465 | 3/2010 |

(Continued)

OTHER PUBLICATIONS

Japanese Office Action for Japanese Patent Application No. 2011-134721 mailed on Apr. 17, 2013.

(Continued)

*Primary Examiner* — Stephen R Koziol
*Assistant Examiner* — Totam Le
(74) *Attorney, Agent, or Firm* — Amin, Turocy & Watson, LLP

(57) ABSTRACT

A sales data processing apparatus which registers and processes sales data on a transaction-by-transaction basis. The apparatus includes: an imaging module that images a customer who is waiting for registration; a manipulation determination module that determines whether or not a prescribed one of a series of manipulations for registration of sales data of one transaction was performed; and a generation module that generates customer identification image data based on an image taken by the imaging module if the manipulation determination module determines that the prescribed manipulation was performed.

10 Claims, 12 Drawing Sheets

(56) References Cited

FOREIGN PATENT DOCUMENTS

| | | |
|---|---|---|
| JP | 2010-061467 | 3/2010 |
| JP | 2011-065326 | 3/2011 |
| JP | 2011-086087 | 4/2011 |
| WO | 2010044338 | 4/2010 |
| WO | 2011-046128 | 4/2011 |

OTHER PUBLICATIONS

Office Action of Notification of Reasons for Refusal for Japanese Patent Application No. 2013-135784 Dated Jun. 10, 2014, 6 pgs.
Office Action for Chinese Patent Application No. 201210203784.9 Dated May 5, 2014, 17 pgs.
Japanese Office Action for Japanese Patent Application No. 2013-135784 mailed Aug. 20, 2014.

\* cited by examiner

CUSTOMER IMAGE TAKEN BY IMAGING CUSTOMERS
WHO FORM A QUEUE FOR REGISTRATION

MONITORING IMAGE TAKEN BY IMAGING OPERATOR
AND OPERATION SITUATION

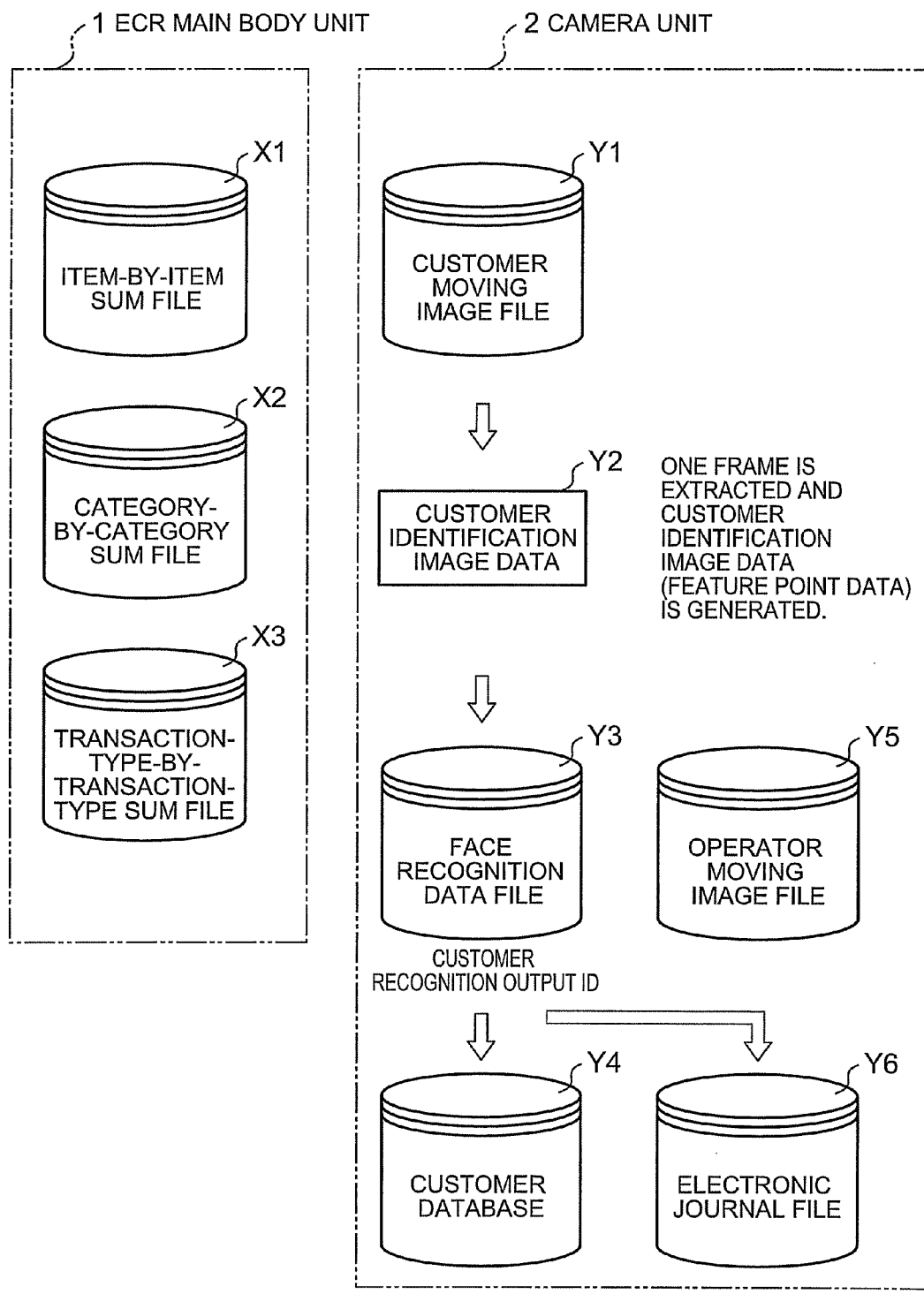

FIG. 6

Y4 CUSTOMER DATABASE

| CUSTOMER RECOGNITION OUTPUT ID | GENDER | AGE GROUP | DETECTION SCORE | REGISTRATION DATE | ⋮ |
|---|---|---|---|---|---|
| 20110510001 | MALE | 30S | 9 | MAY 10, 2011 | ⋮ |
| 20110510002 | FEMALE | 20S | 10 | MAY 10, 2011 | ⋮ |
| 20110510003 | FEMALE | 60S | 8 | MAY 10, 2011 | ⋮ |
| ⋮ | ⋮ | ⋮ | ⋮ | ⋮ | ⋮ |

FIG. 7

Y6 ELECTRONIC JOURNAL FILE

| MOVING IMAGE FILE NAME | EVENT KIND | EVENT YEAR/MONTH/DAY | EVENT TIME | ITEM CODE | PRICE | CUSTOMER RECOGNITION OUTPUT ID | ... |
|---|---|---|---|---|---|---|---|
| 20110510001 | ITEM REGISTRATION | 2011/5/10 | 13 HOURS 50 MINUTES 30 SECONDS 00 | **** | 300 YEN | **** | ... |
| — | ITEM REGISTRATION | 2011/5/10 | 13 HOURS 51 MINUTES 10 SECONDS 60 | **** | 500 YEN | — | ... |
| — | SUBTOTAL | 2011/5/10 | 13 HOURS 51 MINUTES 11 SECONDS 10 | **** | 800 YEN | — | ... |
| — | CASH/DEPOSIT | 2011/5/10 | 13 HOURS 51 MINUTES 12 SECONDS 50 | **** | 1,000 YEN | — | ... |
| 20110510002 | **** | **** | **** | **** | **** | **** | ... |
| ... | ... | ... | ... | ... | ... | ... | ... |

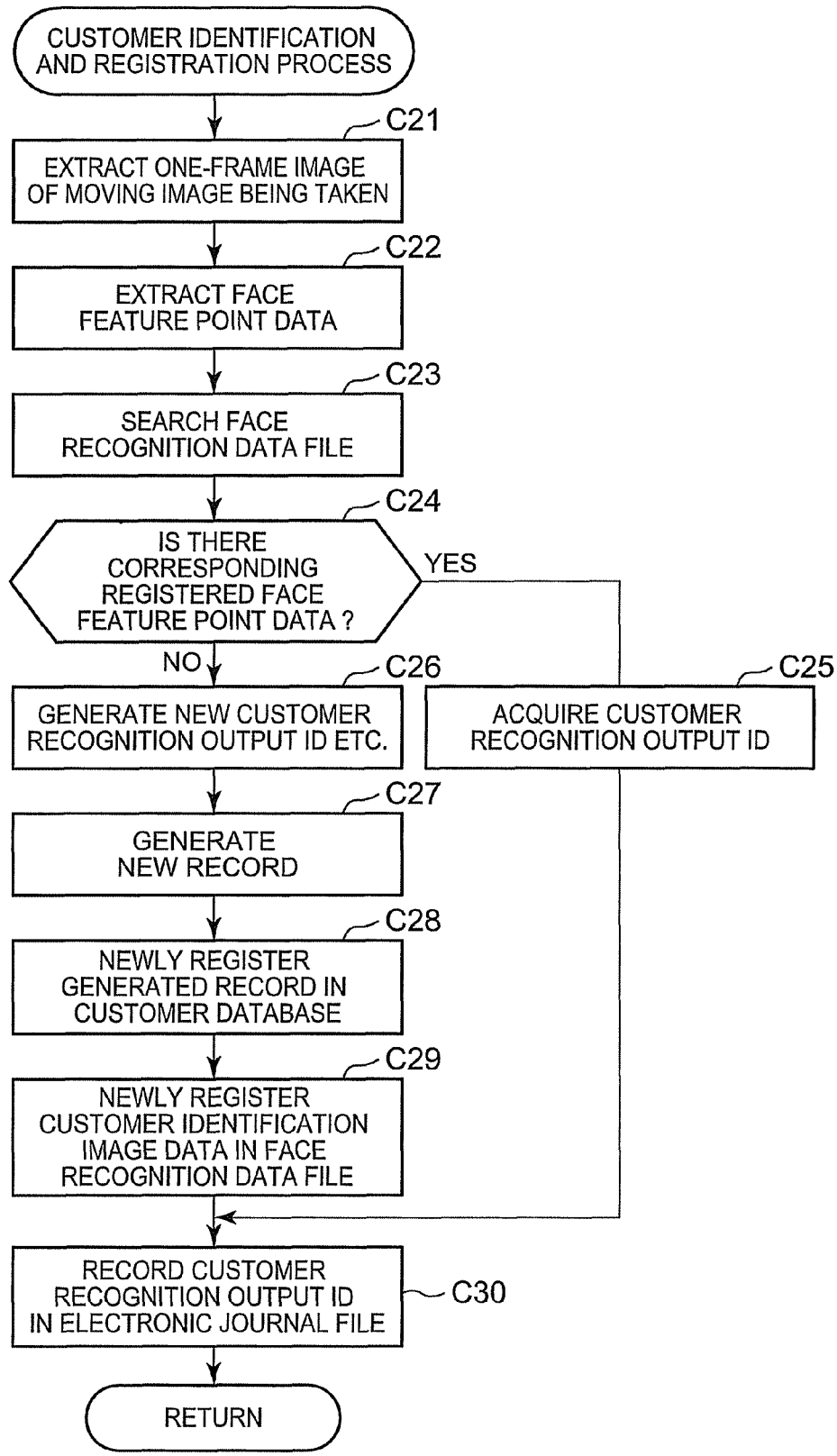

SALES DATA PROCESSING APPARATUS AND COMPUTER-READABLE STORAGE MEDIUM

CROSS REFERENCE TO RELATED APPLICATION(S)

The present disclosure relates to the subject matters contained in Japanese Patent Application No. 2011-134721 filed on Jun. 17, 2011, which are incorporated herein by reference in its entirety.

FIELD

One or more examples of the present invention relate to a sales data processing apparatus and a computer-readable storage medium for registering and processing sales data on a transaction-by-transaction basis.

BACKGROUND

In general, in stores, sales data that have been registered and processed by sales data processing apparatus such as electronic cash registers (ECRs) or point of sale (POS) terminals are analyzed and attributes (shopping frequencies, repeat rates, genders, age groups, etc.) of customers (purchasers) are also analyzed. For example, shopping frequencies, repeat rates, genders, age groups, etc. of customers are analyzed by identifying the customers (member IDs) and recording shopping history data on the basis of card data that are read from their member's cards that were issued in advance. However, this customer analysis method using member's cards may have problems that the issuance of member's cards requires time, labor, and cost, it may become necessary to increase the membership joining ratio, and non-member customers are not involved in a customer analysis.

A technique for addressing the above is known in which a camera for imaging the face of each customer is provided, a customer is identified by extracting features of his or her face from an image taken by the camera and comparing them with the contents (face feature point data) of a customer database, and customer data (name, address, telephone number, etc.) that is correlated with the identified customer is read from the customer database (refer to JP-A-2001-325433).

However, the technique of JP-A-2001-325433 still has a problem that even if the face of a customer is shot with the camera, proper features of the face need not always be extracted from a face image taken at a high probability, that is, the reliability of face recognition is not sufficiently high.

SUMMARY

An object of the embodiments is to make it possible to generate image data for customer identification with proper timing and to identify a customer at a high probability on the basis of a customer image obtained by imaging the customer.

According to one aspect of the embodiments, there is provided a sales data processing apparatus which registers and processes sales data on a transaction-by-transaction basis. The apparatus includes: an imaging module configured to image a customer who is waiting for registration; a manipulation determination module configured to determine whether or not a prescribed one of a series of manipulations for registration of sales data of one transaction was performed; and a generation module configured to generate customer identification image data based on an image taken by the imaging module if the manipulation determination module determines that the prescribed manipulation was performed.

According to another aspect of the embodiments, there is provided a computer-readable storage medium that stores a program for causing a computer to execute procedures including: registering and processing sales data on a transaction-by-transaction basis; determining whether or not a prescribed one of a series of manipulations for registration of sales data of one transaction was performed; and generating customer identification image data based on an image taken by an imaging module configured to image a customer who is waiting for registration if it is determined that the prescribed manipulation was performed.

The embodiments make it possible to generate image data for customer identification with proper timing and to identify a customer at a high probability based on a customer image obtained by imaging the customer, and thereby provides a sales data processing apparatus which is highly reliable and practical.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 5 shows various files that are stored in and managed by an ECR main body unit 1 and various files and a database that are stored in and managed by a camera unit 2.

FIG. 6 illustrates a customer database Y4.

FIG. 7 illustrates an electronic journal file Y6.

FIG. 8 is a main flowchart for description of a process characteristic of the first embodiment in the process of the entire ECR which is started upon power-on.

FIG. 12 is a flowchart for detailed description of a customer identification and registration process (step A31 shown in FIG. 11) of the second embodiment.

DETAILED DESCRIPTION OF THE EMBODIMENTS

Embodiments of the present invention will be hereinafter described in detail with reference to the drawings.
(First Embodiment)
First, a first embodiment of the invention will be described with reference to FIGS. 1 to 10.

Figure 1:
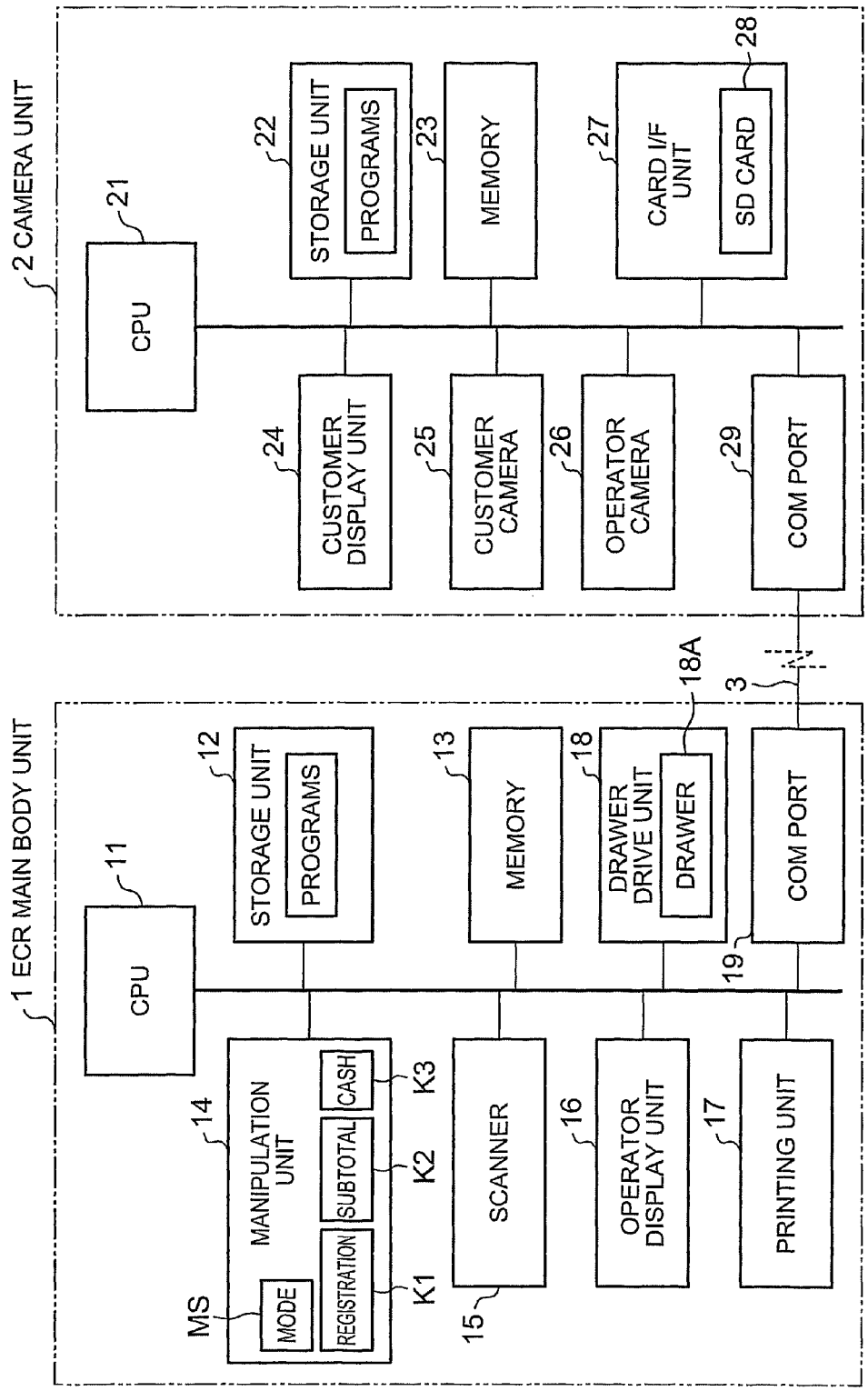
FIG. 1 is a block diagram showing basic constituent blocks of an ECR as an example sales data processing apparatus according to a first embodiment.

FIG. 1 is a block diagram showing basic constituent blocks of an electronic cash register (ECR) as an example sales data processing apparatus.

This ECR is separated into an ECR main body unit 1 and a camera unit 2. The camera unit 2 is attached to the ECR main body unit 1 detachably and connected to the latter by a cable 3. The ECR main body unit 1 is provided with basic (standard) ECR functions, an example of which is a sales data registration function of registration-processing input sale data of one transaction and performing accounting processing according to bills and coins that are handed over from a customer after the registration processing of the one transaction. In the embodiment, the ECR main body unit 1 is also provided with a function of generating event codes corresponding to various key manipulations, drawer opening and closure, etc. and transferring the generated event codes to the camera unit 2 as journal data.

The camera unit 2 is provided with not only a camera function of imaging a customer who is waiting for registration (checkout) and an operator and his or her manipulation situations but also a customer identifying function of identifying a customer on the basis of a customer image taken by the camera function and a customer analyzing function of performing a customer (purchaser) analysis on the basis of a customer identification result produced by the customer identifying function. These functions are implemented as modules. Attached to the ECR main body unit 1 detachably and connected to the latter by the cable 3, the camera unit 2 can be replaced by a new one anytime freely when, for example, it has failed. When necessary, the ECR main body unit 1 and the camera unit 2 cooperate to perform any of various kinds of processing.

The ECR main body unit 1 is centered by a CPU (central processing unit) 11 which controls the entire operation of the ECR main body unit 1 according to various programs. A storage unit 12 is equipped with storage media such as a ROM, a RAM, and a flash memory and drive systems therefor, and stores programs for causing the ECR to operate according to processes to be described later with reference to FIGS. 8-10, various applications, etc. and also stores a database, character font data, etc. The above-mentioned storage media are not limited to fixed, built-in storage media and may be detachable and portable external storage media. And the above-mentioned programs and data may be installed in the storage media from another apparatus via a wired or wireless transmission line or used by accessing a server which stores and manages the programs and data. A memory 13 is a work area for temporarily storing various data such as time data and flags that are necessary for operation of the ECR main body unit 1.

Input/output peripheral devices of the CPU 11 which are a manipulation unit 14, a scanner 15, an operator display unit 16, a printing unit 17, a drawer drive unit 18, and a COM port 19 are connected to the CPU 11 by a bus line. The CPU 11 controls their operations according to input/output programs. The manipulation unit 14 has a mode switch MS and a keyboard on which various push-button keys are arranged. In addition to a ten-key unit (not shown) etc., registration keys K1, a subtotal key K2, accounting keys K3 such as a cash/deposit key, and other keys are arranged on the keyboard.

The mode switch MS is a rotary switch for switching between various operation modes (program kinds) such as a registration (REG) mode, a return (RF) mode, and a final accounting (Z) mode according to its switching position. The registration keys K1 are an item key for commanding item-by-item registration such as a FLU (price look up) key, a category key, etc. The subtotal key K2 is a key for displaying, as a subtotal amount, the sum of values of sales data registered so far in one transaction. The accounting keys K3 which serve to finish registration of one transaction are a cash/deposit key and a credit key. In the registration (REG) mode, the CPU 11 generates an event code according to each of various kinds of key manipulations and performs registration processing of displaying input sales data and updating the sum of sales values. When one of the accounting keys K3 is pushed after completion of registration of one transaction, the CPU 11 causes opening of a drawer 18A and issuance of a receipt.

The image scanner 15 has an image sensor such as a CCD or a CMOS sensor and serves to read a bar code or a two-dimensional code attached to an item by imaging it when the item is scanned at the time of registration. The CPU 11 decodes a bar code or the like by analyzing image data obtained by the image scanner 15 and thereby identifies the item. The operator display unit 16 displays a price of an item, data or a message relating to the item, etc. to an operator, and is a liquid crystal display, an organic EL (electroluminescence) display, or the like. The printing unit 17, which is a non-impact printer of thermal transfer, ink jet, or a like type or a dot impact printer, performs receipt printing. The drawer drive unit 18 controls the opening/closure of the drawer 18A in response to a key manipulation. When the drawer 18A is opened or closed, the CPU 11 generates a drawer opening/closure event. The COM port 19 is a serial port for connection to the camera unit 2.

The camera unit 2 is centered by a CPU (central processing unit) 21 which controls the entire operation of the camera unit 2 according to various programs. A storage unit 22 is equipped with storage media such as a ROM, a RAM, and a flash memory and drive systems therefor, and stores programs for causing the ECR to operate according to a process to be described later with reference to FIG. 10, various applications, etc. A memory 23 is a work area for temporarily storing various data that are necessary for operation of the camera unit 2.

Input/output peripheral devices of the CPU 21 which are a customer display unit 24, a customer camera 25, an operator camera 26, a card interface unit 27, and a COM port 29 are connected to the CPU 21 by a bus line. The CPU 21 controls their operations according to input/output programs. The customer display unit 24 is provided for a customer who is waiting for registration (checkout) and its screen faces the customer. Being a 7-segment light-emitting diode (LED) display, for example, the customer display unit 24 displays numerical values representing a unit price of an item, a number, a subtotal amount, a deposit amount, etc.

The customer camera 25 is disposed close to the customer display unit 24 and images mainly the face of a customer who is waiting for registration. The operator camera 26 is a monitoring camera for imaging an operator and his or her manipulation situations. Although neither of the customer camera 25 nor the operator camera 26 is illustrated in detail, each of them has a lens unit, an imaging device, an A/D (analog-to-digital) conversion section, etc. and can take a moving image. Each of the customer camera 25 and the operator camera 26 can take a high-resolution image of a subject by forming a subject image on the imaging device such as a CCD or a CMOS sensor by the lens unit.

An SD card 28 as a recording medium is inserted into the card interface unit 27. The SD card 28 is stored with various files (described later). The camera unit 2 is provided with a lock (not shown) for preventing theft or the like of the SD card 28 inserted in the card interface unit 27. To take out the SD card 28, it is necessary for a person in charge to open the lock using a dedicated key he or she keeps. The external storage medium is not limited to the SD card and may be of another type. The COM port 29 is a serial port for connection to the ECR main body unit 1.

Figure 2:
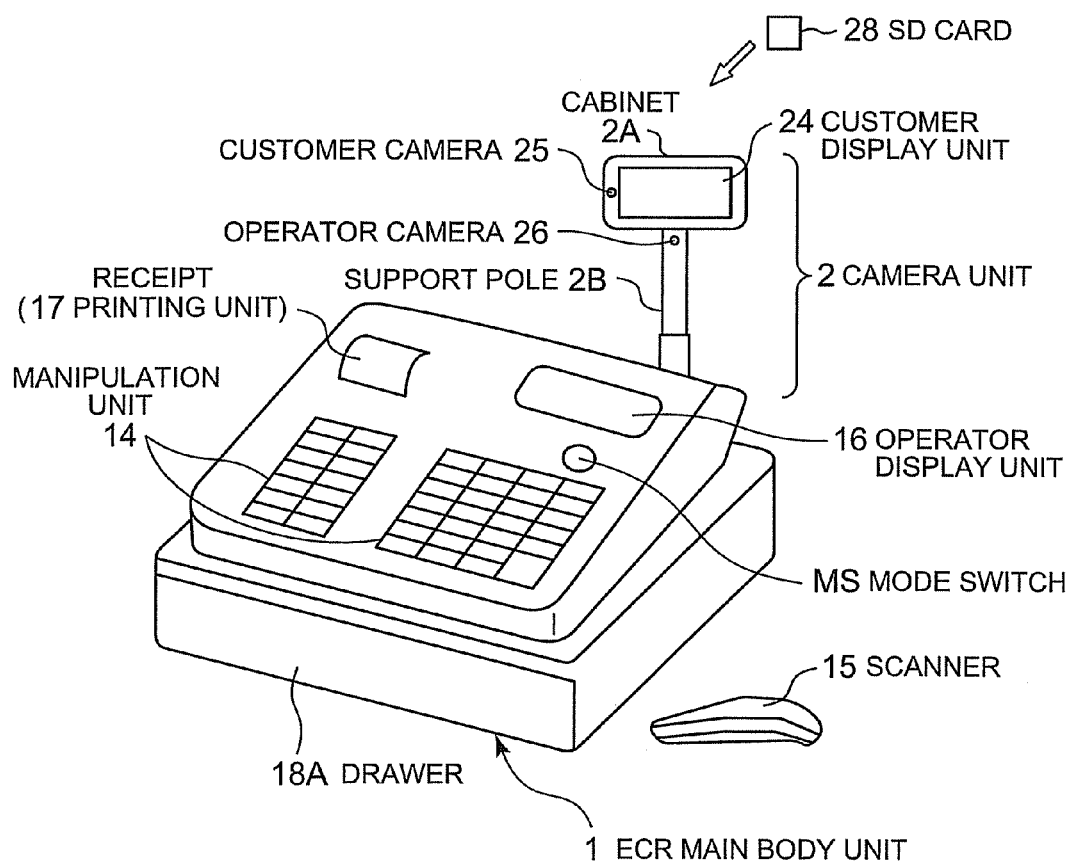
FIG. 2 is a perspective view showing an appearance of the ECR as viewed obliquely from the front side (from the customer side).
Figure 3:
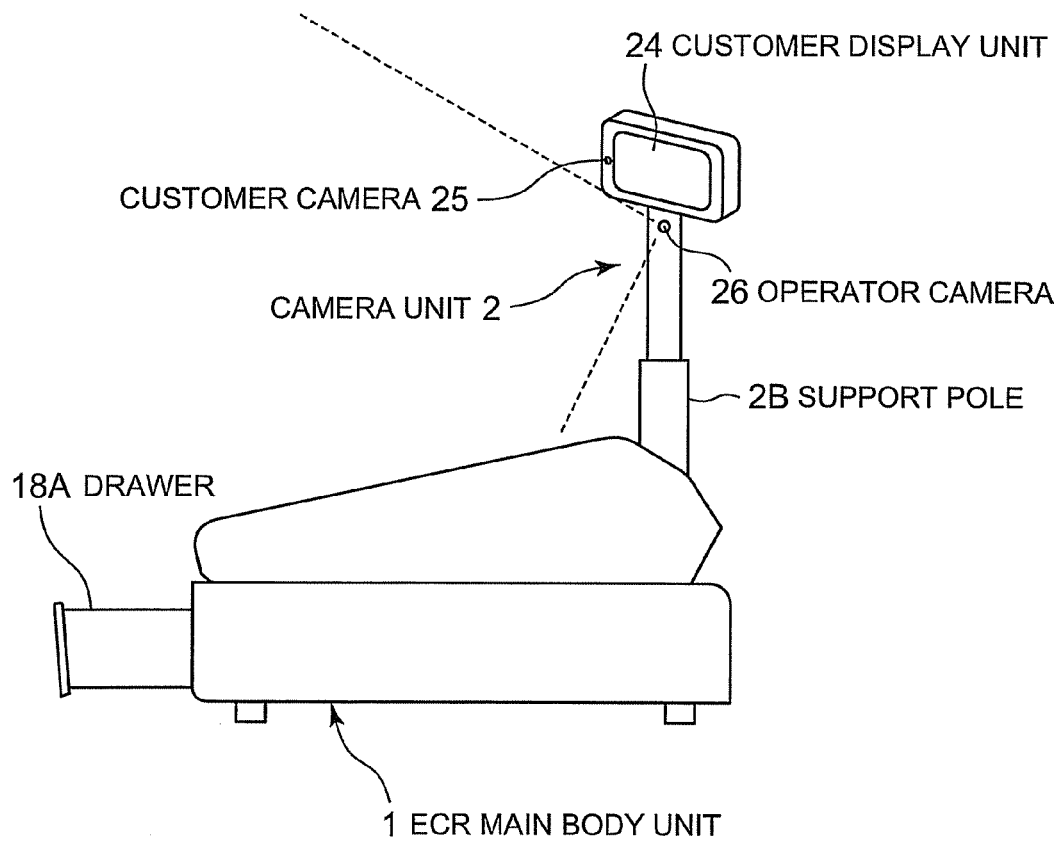
FIG. 3 is a side view showing a side appearance of the ECR.

FIG. 2 is a perspective view showing an appearance of the above-configured ECR as viewed obliquely from the front side (from the customer side). FIG. 3 is a side view showing a side appearance of the ECR.

The top surface of the ECR main body unit 1 is provided with the operator display unit 16 as well as the keyboard and the mode switch MS which constitute the manipulation unit 14. The top surface of the ECR main body unit 1 is also provided with a receipt issuance opening (not shown) through which to take out a receipt that is sent out from the printing unit 17.

The camera unit 2 has a cabinet 2A of the customer display unit 24 and a pole-shaped support member (support pole) 2B which supports the cabinet 2A. A bottom portion of the support pole 2B is fixed to the backside of the ECR main body unit 1 so that the support pole 2B is erected vertically. The cabinet 2A of the customer display unit 24 is attached to a top portion of the support pole 2B. The support pole 2B is configured so that its length is adjustable, and the cabinet 2A of the customer display unit 24 is rotatable with respect to the support pole 2B. That is, the height and the direction of the cabinet 2A are adjustable and the height and the direction of the customer display unit 24 and the customer camera 25 are adjustable accordingly.

Figure 4A:
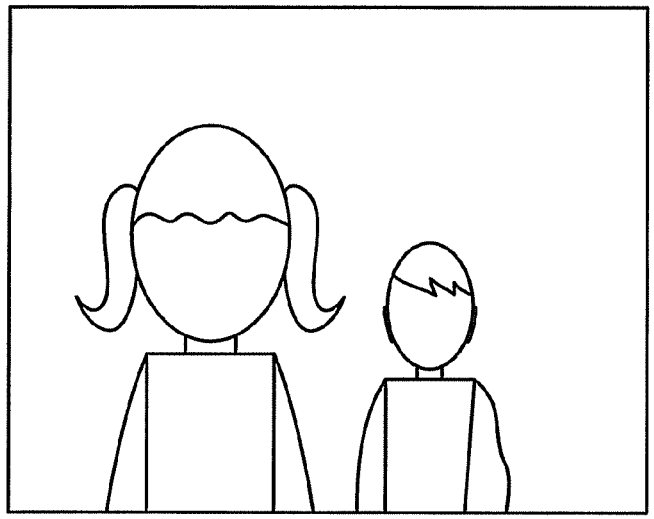
FIG. 4A shows an example image taken by a customer camera 25 and FIG. 4B shows an example image taken by an operator camera 26.

As shown in FIGS. 2 and 3, the customer camera 25 is disposed on the front surface of the cabinet 2A close to one end (in FIGS. 2 and 3, the left end) of the customer display unit 24. The imaging direction of the customer camera 25 is toward a customer who is waiting for registration, and its angle of view is set in such a range that the customer camera 25 can image a customer who is waiting for registration. FIG. 4A shows an example image taken by the customer camera 25 which includes a head customer and a second customer who stands behind the head customer.

Figure 4B:
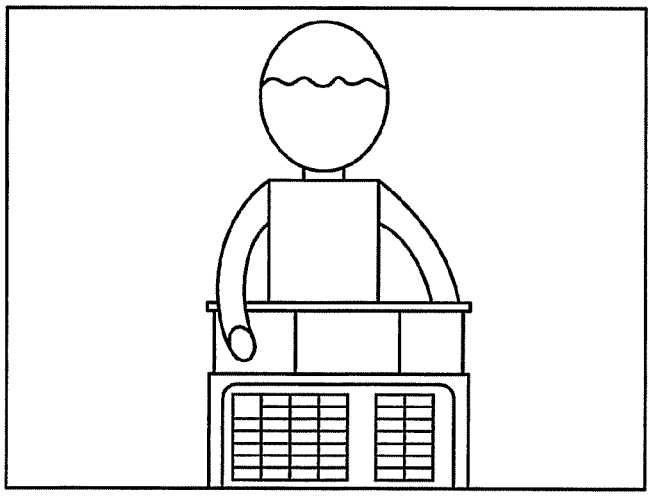

The operator camera 26 is disposed close to the top of the support pole 2B. The imaging direction of the operator camera 26 is toward an operator, and its angle of view is set in such a range that the operator camera 26 can image the entire manipulation unit 14 and the face of an operator who is manipulating the ECR. FIG. 4B shows an example monitoring image taken by the operator camera 26 which includes an operator and an operation situation that the operator is putting or taking coins into or out of the drawer 18A which is opened.

FIG. 5 shows various files that are stored in and managed by the ECR main body unit 1 and various files and a database that are stored in and managed by the camera unit 2.

An item-by-item sum file X1, a category-by-category sum file X2, a transaction-type-by-transaction-type sum file X3, etc. are stored in and managed by the ECR main body unit 1. The item-by-item sum file X1, the category-by-category sum file X2, and the transaction-type-by-transaction-type sum file X3 are files for storing and managing sum values etc. of sales data (numbers and sales values) for each item, each category (packed lunches, breads, or the like), and each transaction type (cash sale, credit sale, or the like), respectively.

A customer moving image file Y1, customer identification image data Y2, a face recognition data file Y3, a customer database Y4, an operator moving image file Y5, an electronic journal file Y6, etc. are stored in and managed by the camera unit 2. The customer moving image file Y1 contains files of moving images taken by the customer camera 25. Recording dates and times (time stamps) are stored successively together with file names or the like of moving image files so as to be correlated with the respective moving image files. The customer identification image data Y2 is face feature point data obtained by analyzing a customer face in an image (still image) that is extracted for customer identification for each transaction from a moving image in the customer moving image file Y1. After the end of registration work of each day, the CPU 21 generates customer identification image data Y2 (face feature point data) Y2 for each transaction from a moving image in the customer moving image file Y1.

More specifically, after the end of registration work (at the time of final accounting) of each day, the CPU 21 generates customer identification image data Y2 by extracting, from a moving image in the customer moving image file Y1, images (still images) recorded at positions corresponding to event times (described later) which are times of prescribed ones of a series of manipulations performed until registration of sales data of each transaction, that is, manipulations of the subtotal key K2 for displaying price data on the customer display unit 24 and the accounting keys K3 and then analyzing the extracted images. Although in the embodiment face feature point data is generated as customer identification image data Y2 by analyzing an extracted image (still image), the invention is not limited to such a case; an extracted image (still image) itself may be employed as customer identification image data Y2.

The face recognition data file Y3 contains face recognition image files which are compared with customer identification image data Y2 in identifying the customer on the basis of the customer identification image data Y2. The face recognition data file Y3 is used for storing and managing face recognition data (face feature point data) and a customer recognition output ID for each customer. The customer recognition output ID is identification data for identification of a customer who has been recognized by performing processing of recognizing his or her face on the basis of an image taken by the customer camera 25.

The customer database Y4 is a file for storing and managing data relating to each customer. The operator moving image file Y5 contains files of moving images taken by the operator camera 26. Recording dates and times (time stamps) are stored successively together with file names of moving image files so as to be correlated with the respective moving image files. The electronic journal file Y6 is a file for storing and managing sales data and manipulation situations for each transaction as sales record data (journal data).

FIG. 6 illustrates the customer database Y4.

The customer database Y4 has such items as a customer recognition output ID, a gender, an age group, a detection score, and a registration date. The customer recognition output ID is customer identification data for linkage with the face recognition data file Y3. The gender and the age group are data that are input on the store side by estimating a gender and an age group on the basis of a customer image. The detection score is data which is one of numerical values "1" to "10" and represents how close to a completely frontal face (value "10") a face detected from a shot image is.

FIG. 7 illustrates the electronic journal file Y6.

The electronic journal file Y6 has such items as a moving image file name, an event kind, an event year/month/day, an event time, an item code, a price, and a customer recognition output ID. The moving image file name is data for linkage with the operator moving image file Y5 and is a year/month/day number followed by a serial number. The event kind indicates a manipulation kind and is an event code indicating a manipulation of one of the registration keys K1, a manipulation of the subtotal key K2, a manipulation of one of the accounting keys K3, drawer opening/closure, or the like. The event year/month/day is a year/month/day when the manipulation was performed, and the event time is a time (hours, minutes, seconds, and 1/100 seconds) when the manipulation was performed. The customer recognition output ID is customer identification data for linkage with the face recognition data file Y3 and is a serial number or the like.

Next, an operation concept of the ECR according to the first embodiment will be described with reference to flowcharts of FIGS. 8-10. Each step of each flowchart is stored in the form of readable program code and these steps are executed successively according to the program code. Alternatively, these steps may be executed successively according to the program code that is transmitted over a transmission medium such as a network. This also applies to a second embodiment which will be described later. Steps unique to each embodiment may be performed using programs and data that are supplied externally via a transmission medium instead of being stored in a recording medium.

Figure 8:
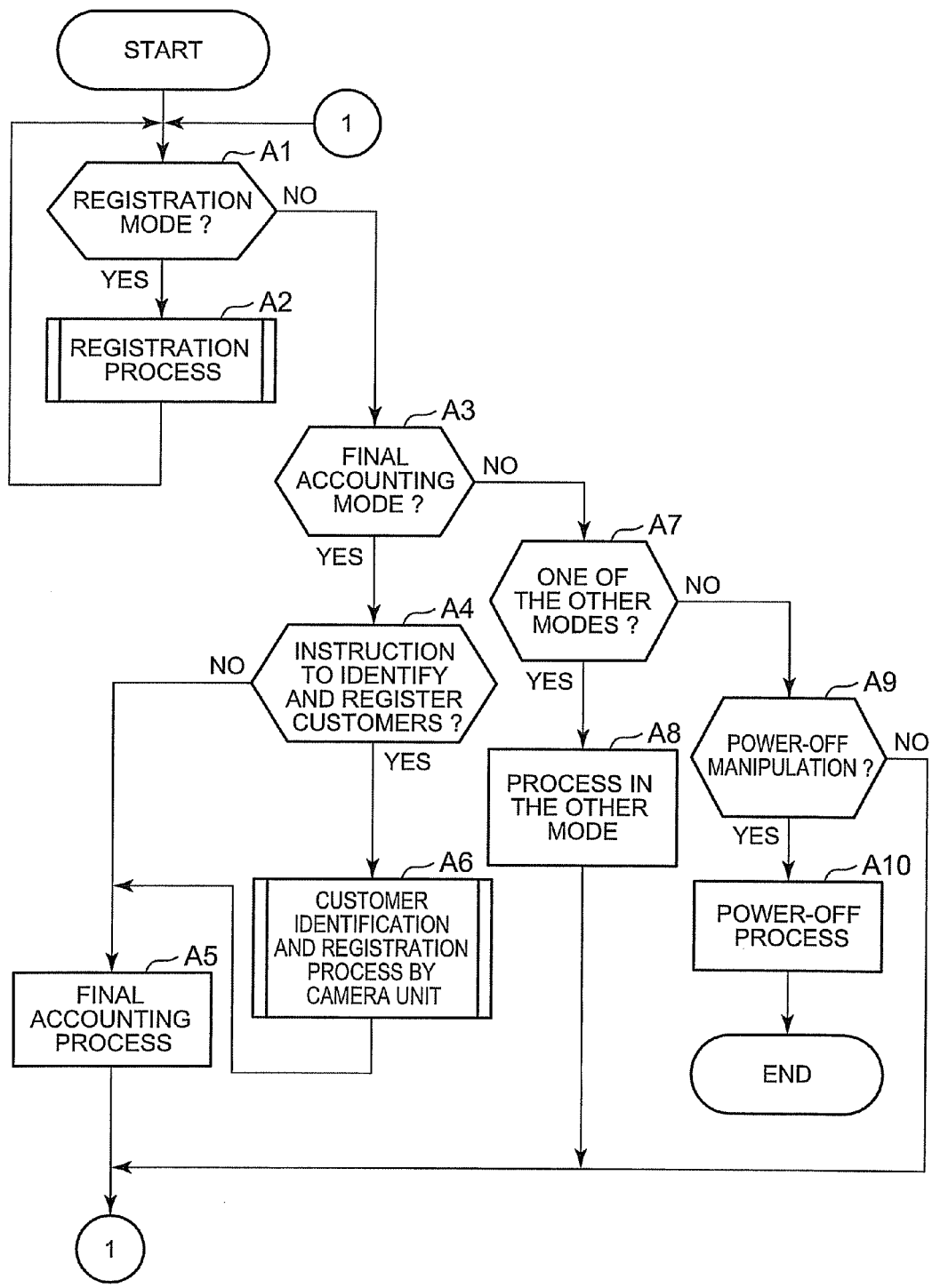

FIG. 8 is a main flowchart for description of a process characteristic of the first embodiment in the process of the entire ECR which is started upon power-on.

The CPU 11 of the ECR main body unit 1 determines whether the mode switch MS is at the position of the registration (REG) mode (step A1 shown in FIG. 8), the final accounting (Z) mode (step A3), or one of the other modes (step A7), and whether or not a power-off manipulation has been made (step A9). If the mode switch MS is at the position of the registration mode (A1: yes), in response to a registration manipulation the process moves to a registration process (step A2) where sales data are registered.

Figure 9:
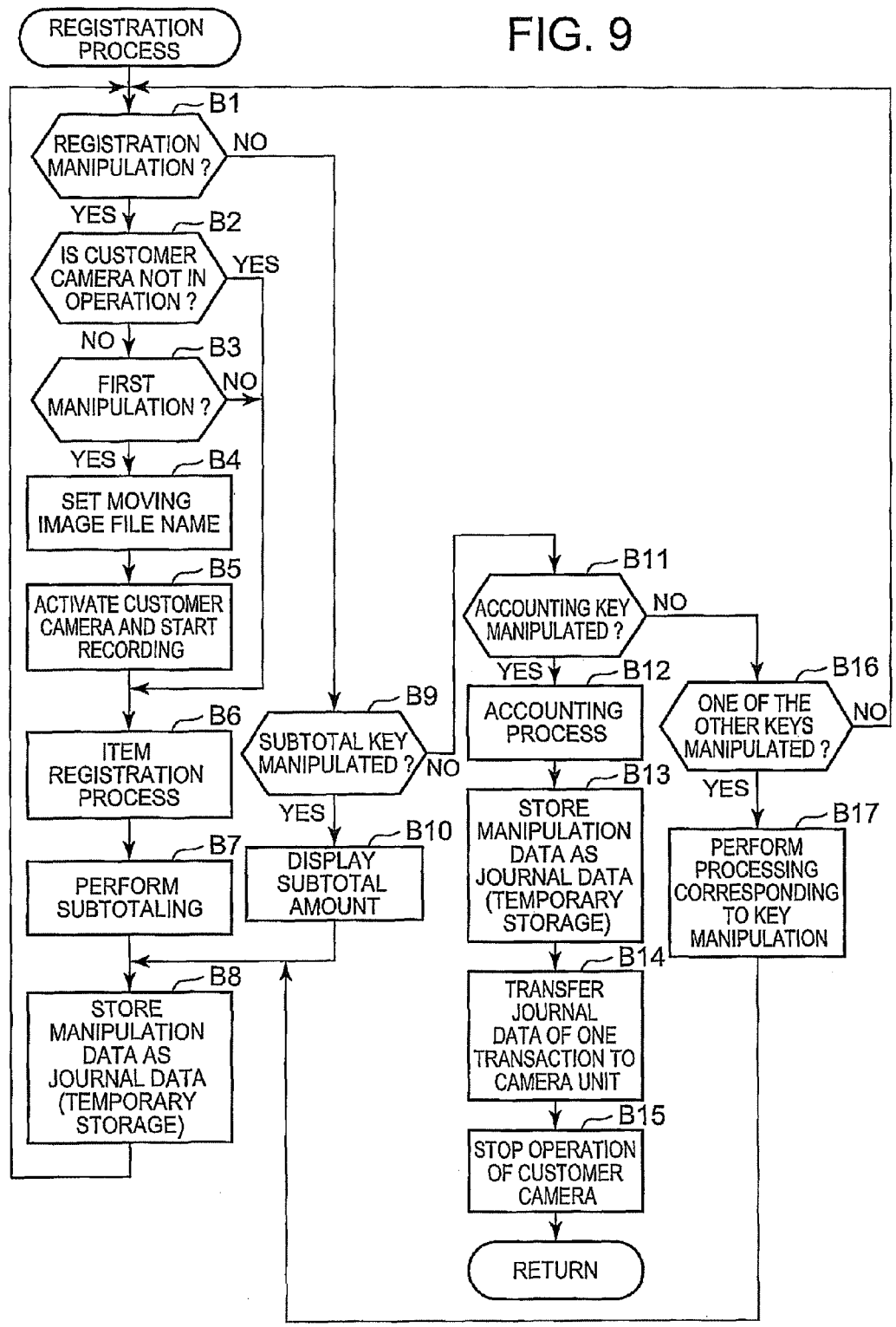
FIG. 9 is a flowchart for detailed description of a registration process (step A2 shown in FIG. 8).

FIG. 9 is a flowchart for detailed description of the registration process (step A2 shown in FIG. 8). The ECR main body unit 1 performs various kinds of processing by cooperating with the camera unit 2, when necessary.

The CPU 11 of the ECR main body unit 1 determines whether a registration manipulation has been performed, that is, scanning has been performed with the scanner 15 to read a bar code or the like from an item or one of the registration keys K1 (e.g., item key) has been manipulated after input of a price (step B1 shown in FIG. 9), whether or not the subtotal key K2 has been manipulated (step B9), whether or not one of the accounting keys K3 (e.g., cash/deposit key) has been manipulated after registration of one transaction (step B11), and whether or not one of the other keys has been manipulated (step B16).

If a registration manipulation has been performed (B1: yes), the process moves to step B2, where the CPU 11 of the ECR main body unit 1 determines whether the customer camera 25 is not performing a imaging operation by accessing the camera unit 2. If the customer camera 25 is not performing a imaging operation (B2: no), at step B3 the CPU 11 determines whether or not a first manipulation of one transaction has been performed, that is, scanning has been performed with the scanner 15 to read a bar code or the like from an item or one of the registration keys K1 (e.g., item key) has been manipulated after input of a price. If a first manipulation of one transaction has been performed (B3: yes), at step 34 the CPU 11 generates a moving image file name and transfers it to the camera unit 2 and thereby causes the camera unit 2 to set the generated moving image file name in the electronic journal file Y6. At step B5, the CPU 11 causes the camera unit 2 to activate the customer camera 25 and start a recording operation of successively recording images taken by the customer camera 25. Then, the process moves to an item registration process (step B6).

On the other hand, if the customer camera 25 is in operation (B2: yes) or the detected manipulation is not a first one (B3: no) even if the customer camera 25 is not in operation, the process moves to the item registration process (step B6) skipping the above-described steps B4 and B5. In the item registration process (step B6), the CPU 11 displays an input item name and unit price on the operator display unit 16 and the customer display unit 24 and performs processing of updating the contents (sales data) of the item-by-item sum file X1 and the category-by-category sum file X2. The CPU 11 displays an item name and a unit price on the customer display unit 24 by transferring display data from the ECR main body unit 1 to the camera unit 2.

Then, at step B7, the CPU 11 updates the subtotal of the one transaction concerned. At step B8, the CPU 11 stores the sales data registered this time and associated manipulation data (event data) in the work area as journal data (temporary storage). Then, the process returns to step B1. The above steps are executed again every time a registration manipulation is made.

If the subtotal key K2 is manipulated (B9: yes), at step B10 the CPU 11 displays a subtotal amount on the operator display unit 16 and the customer display unit 24. Then, the process moves to the above-described step B8, where the CPU 11 stores the subtotal amount and associated manipulation data (event data) as journal data (temporary storage).

If one of the other keys (e.g., correction key) is manipulated (B16: yes), at step B17 the CPU 11 performs processing corresponding to the manipulation (e.g., correction processing). Then, the process moves to the above-described step B8, where the CPU 11 stores a processing result and associated manipulation data (event data) as journal data (temporary storage).

If one of the accounting keys K3 (e.g., cash/deposit key) is manipulated after the end of registration of the one transaction concerned (B11: yes), the CPU 11 performs an accounting process (update of transaction-type-by-transaction-type sums; step B12) according to bills and coins that have been handed over from the customer, performs receipt printing and issuance of a receipt, and opens the drawer 18A. At step B13, the CPU 11 stores associated accounting manipulation data (event data) as journal data (temporary storage). At step B14, the CPU 11 transfers the event data of the one transaction concerned that have been stored temporarily in the above-described manners to the camera unit 2 as journal data. The camera unit 2 performs processing of additionally registering the event data of the one transaction concerned in the electronic journal file Y6. At step B15, the operation of the customer camera 25 is stopped. Then, the process of FIG. 9 is finished and an exit is made from it.

Upon the completion of the registration process (step A2 shown in FIG. 8), the process returns to step A1 shown in FIG. 8. If the registration mode is effective (A1: yes), the above-described registration process (step S2) is executed again according to manipulations. When the whole day business has finished and the mode switch MS is switched to the final accounting (Z) mode (A3: yes), at step A4 the CPU 11 determines whether or not a manipulation that commands identification and registration of the customers has been made. If no such manipulation has been made (A4: no), the CPU 11 executes a final accounting process (step A5) of updating the contents of the transaction-type-by-transaction-type sum file X3 etc. Then, the process returns to step A1.

If a manipulation that commands identification and registration of the customers has been made (A4: yes), the CPU 11 of the ECR main body unit 1 causes the camera unit 2 to execute a customer identification and registration process (step A6; described later) by giving the camera unit 2 an instruction that corresponds to the received manipulation. Then, the process moves to the above-described final accounting process (step A5). If the mode switch MS is at the position of one of the other modes (e.g., setting mode; A7: yes), at step A8 the CPU 11 performs processing corresponding to the other mode (e.g., processing of setting various data). Then, the process returns to step A1. If a power-off manipulation is performed (A9: yes), the CPU 11 executes a prescribed power-off process (step A10). Then, the process of FIG. 8 is finished.

Figure 10:
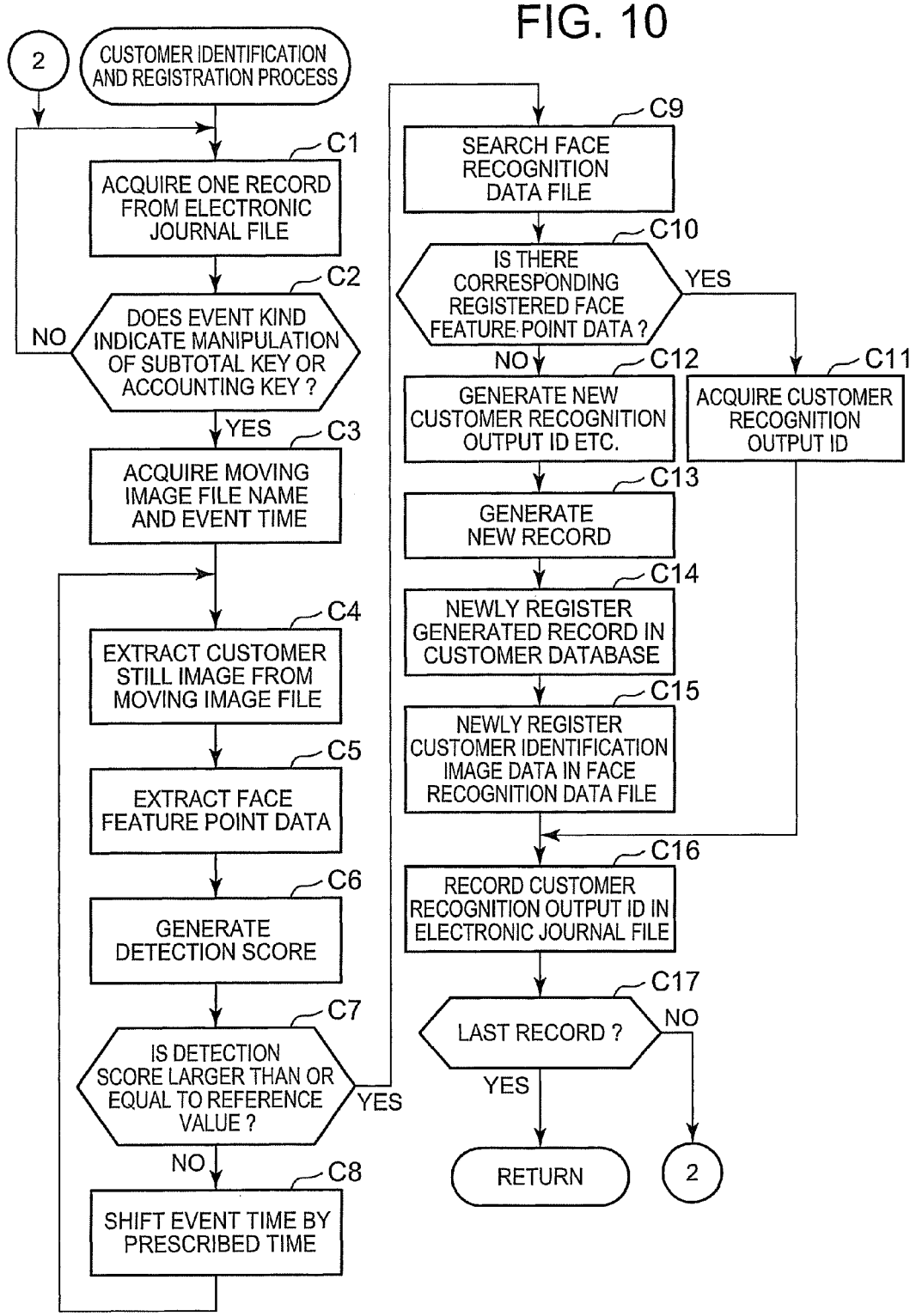
FIG. 10 is a flowchart for detailed description of a customer identification and registration process (step A6 shown in FIG. 8).

FIG. 10 is a flowchart for detailed description of the customer identification and registration process (step A6 shown in FIG. 8).

First, at step C1, the CPU 21 of the camera unit 2 designates one record of the electronic journal file Y6 and acquires the specified record. At step C2, the CPU 21 determines whether the event kind of the acquired record indicates a manipulation of the subtotal key K2 or one of the accounting keys K3 (e.g., subtotal key or cash/deposit key). If the event kind does not indicate a manipulation of the subtotal key K2 or one of the accounting keys K3 (C2: no), the process returns to step C1 to exclude this record from the subjects of this process. The above-described step C1 is executed repeatedly until an event kind indicating a manipulation of the subtotal key K2 or one of the accounting keys K3 is found.

If a record whose event kind indicates a manipulation of the subtotal key K2 or one of the accounting keys K3 is acquired (C2: yes), at step C3 the CPU 21 acquires the moving image file name and the event time from the record. At step C4, the CPU 21 extracts a corresponding moving image file by searching the customer moving image file Y1 using the moving image file name as a key and extracts a one-frame still image that is located at a position corresponding to the event time from the extracted moving image file. At step C5, the CPU 21 generates customer identification image data Y2 by enlarging the extracted image to a prescribed size by digital zooming, extracting a face portion, and performing face detection processing of extracting face feature point data by analyzing the face image.

In the camera unit 2, feature points of the face of a customer are extracted through a comprehensive analysis of an extracted image, that is, a face outline, shapes of face parts (eyes, mouth, nose, forehead, etc.), relationships between them, etc. Where the extracted image contains plural subjects (customer faces), a largest face is selected from those faces and feature points are extracted from the selected face. Since the embodiment employs the technique of extracting face feature points that is commonly used in cameras, it is not be described in detail here.

At step C6, the CPU 21 of the camera unit 2 generates, as a result of the face detection processing, a detection score which is a numerical value indicating how close to a completely frontal face the face image is. At step C7, the CPU 21 determines whether or not the detection score is larger than or equal to a reference value (e.g., 7). If the detection score is larger than or equal to the reference value (C7: yes), the CPU 21 determines that the face has been recognized correctly and the process moves to step C9. On the other hand, if the detection score is smaller than the reference value (C7: no), the CPU 21 determines that the face has not been recognized correctly because, for example, the face image is a profile. And the process moves to step C8, where the event time is shifted by a prescribed time.

The CPU 21 calculates a shifted event time that succeeds or precedes the current event time by, for example, adding or subtracting 0.5 second to or from the current event time. Then, the process returns to step C4. A one-frame still image located at a position corresponding to the newly calculated event time is extracted at step C5 and the above-described steps C6 and C7 are executed for the new event time. Alternatively, both shifted event times that succeed and precede the current event time, respectively, may be calculated. As a further alternative, shifted event times whose shifts from the current event time increase stepwise with a step of a prescribed time (e.g., 0.5 second) may be calculated; that is, shifted event times may succeed or precede the current event time by 0.5 second, 1 second, 1.5 seconds, and 2 seconds, respectively.

If the detection score is larger than or equal to the reference value (C7: yes), at step C9 the CPU 21 searches the face recognition data file Y3 using the extracted face feature point data (customer identification image data Y2). At step C10, the CPU 21 determines whether or not there exists registered face feature point data that corresponds to, that is, coincides in features with, the extracted face feature point data. If there exists registered face feature point data that coincides in features with the extracted face feature point data (i.e., a match is found with a registered person; C10: yes), at step C11 the CPU 21 determines that the customer has been identified and acquires the corresponding face recognition output ID from the face recognition data file Y3. At step C16, the CPU 21 performs processing of recording the acquired face recognition output ID in the electronic journal file Y6. At step C17, the CPU 21 determines whether or not the last record of the electronic journal file Y6 has been designated. If the last record of the electronic journal file Y6 has not been designated yet (C17: no), the process returns to step C1, where the next record is read out and acquired from the electronic journal file Y6.

On the other hand, if a match is not found with any registered person (C10: no), at step C12 the CPU 21 newly generates a face recognition output ID and a registration date. At step C13, the CPU 21 generates a new record which contains a detection score in addition to the face recognition output ID and the registration date. At step C14, the CPU 21 newly (additionally) registers the generated record in the customer database Y4. At step C15, the CPU 21 additionally registers the customer identification image data Y2 in the face recognition data file Y3 together with the face recognition output ID. At step C16, the CPU 21 records the face recognition output ID in the electronic journal file Y6. Until it is determined at step C17 that the last record of the electronic journal file Y6 has been designated, the process returns to step C1 and the next record is read out and acquired there to execute the above steps repeatedly.

As described above, in the first embodiment, if a prescribed one of a series of manipulations to be performed until registration of sales data of each transaction was performed, customer identification image data Y2 is generated on the basis of an image taken by the customer camera 25. Therefore, an image for customer identification can be generated with proper timing and a customer can be identified at a high probability on the basis of a customer image obtained by imaging the customer. The sales data processing apparatus according to the first embodiment is thus highly reliable and practical.

The customer camera 25 is mounted in the customer display unit 24 to be viewed by a customer who is waiting for registration, and is oriented so as to be able to squarely image the face of a customer who is waiting for registration. Therefore, customer identification image data Y2 can be generated on the basis of an image taken by squarely imaging the face of a customer with such timing that the customer checks a price.

The above-mentioned prescribed manipulation is a manipulation of at least one of the subtotal key K1 which is manipulated to display, as a subtotal, the sum of values of sales data registered so far in one transaction and the accounting keys K3 which are manipulated to close registration of one transaction. Therefore, customer identification image data Y2 can be generated on the basis of an image taken by squarely imaging the face of a customer with such timing that the customer visually checks a display content (price) of the customer display unit 24. This is preferable for face recognition.

An event time which is data stored in the electronic journal file Y6 and indicates timing of a manipulation is read out, an image taken with that timing is extracted from a moving image in the customer moving image file Y1, and customer identification image data Y2 is generated on the basis of the extracted image. Therefore, customer identification image data Y2 corresponding to a prescribed manipulation made can be generated anytime freely from a moving image file.

An event time which is data stored in the electronic journal file Y6 and indicates timing of a manipulation is read out, an image that was taken before or after that timing is extracted from a moving image in the customer moving image file Y1, and customer identification image data Y2 is generated on the basis of the extracted image. Therefore, even if an image corresponding to a manipulation made is not suitable for face recognition, customer identification image data Y2 can be generated on the basis of an image that precedes or succeeds the former image.

Since a customer is identified by searching the face recognition data file Y3 using generated customer identification image data Y2, a customer can be identified easily by face recognition.

Although in the first embodiment, the prescribed manipulations are manipulations of the subtotal key K2 and the accounting keys K3, they may also include the registration keys K1 such as the item key and the category key, a correction key for commanding correction of input data, a return key for canceling input data, or the like.

(Second Embodiment)

A second embodiment of the invention will be hereinafter described with reference to FIGS. 11 and 12.

In the above-described first embodiment, the customer identification and registration process is executed for all transactions when a manipulation commanding customer identification and registration is made in the final accounting mode. In contrast, in the second embodiment, a customer identification and registration process of recognizing and identifying a customer is executed during registration of a transaction to the customer in the registration mode. In the second embodiment, constituent elements having basically the same ones or corresponding ones in the first embodiment will be given the same reference symbols as the latter and will not be described in detail. Only features characteristic of the second embodiment will mainly be described below.

Figure 11:
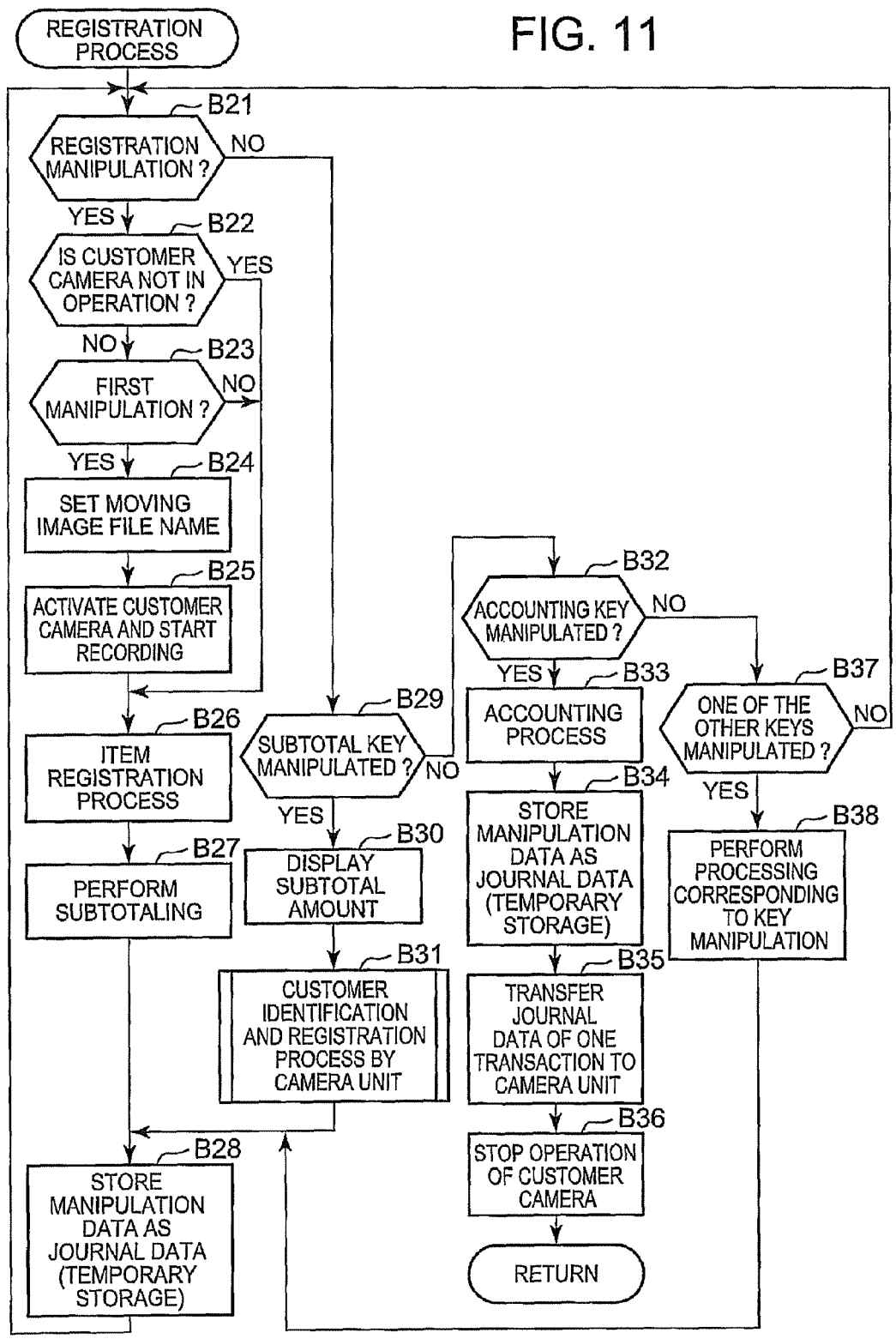
FIG. 11 is a flowchart for detailed description of a registration process (which corresponds to step A2 shown in FIG. 8) of a second embodiment.

FIG. 11 is a flowchart for detailed description of a registration process (which corresponds to step A2 shown in FIG. 8). As in the process shown in FIG. 9, the ECR main body unit 1 performs various kinds of processing by cooperating with the camera unit 2, when necessary. In the following, steps shown in FIG. 11 having basically the same steps in FIG. 9 will be described only briefly.

The CPU 11 of the ECR main body unit 1 determines whether or not a registration manipulation which commands registration of sales data has been performed (step B21 shown in FIG. 11), whether or not the subtotal key K2 has been manipulated (step B29), whether or not one of the accounting keys K3 has been manipulated (step B32), and whether or not one of the other keys has been manipulated (step B37).

If a registration manipulation which commands registration of sales data has been performed (B21: yes), as in steps B2-B8 shown in FIG. 9, steps B24-B28 are executed on condition that the customer camera 25 is not in operation (B22: no) and a first manipulation of one transaction has been performed (B23: yes). At step B24, the CPU 11 causes the camera unit 2 to perform processing for setting a moving image file name. At step B25, the CPU 11 causes the camera unit 2 to activate the customer camera 25 and start a recording operation of successively recording images taken by the customer camera 25. An item registration process is executed at step B26, and the subtotal of the one transaction is updated at step B27. At step B28, event data corresponding to the manipulation concerned is stored as journal data (temporary storage). Then, the process returns to step B21.

If the subtotal key K2 is manipulated (B29: yes), a subtotal amount is displayed at step B30 as at step B10 shown in FIG. 9. In the second embodiment, the process moves to step B28 after execution of a customer identification and registration process (step B31; described later). Steps B32-38 are the same as steps B11-B17 shown in FIG. 9. That is, if one of the other keys is manipulated (B37: yes), processing corresponding to the manipulation is performed at step B38. At step B28, event data relating to the manipulation is stored as journal data (temporary storage). If one of the accounting keys K3 is manipulated (B32: yes), an accounting process is executed at step B33. At step B34, event data relating to the manipulation is stored as journal data (temporary storage). At step B35, the event data of the one transaction concerned that have been stored temporarily are transferred to the camera unit 2 as journal data. At step B36, the operation of the customer camera 25 is stopped. Then, the process of FIG. 11 is finished and an exit is made from it.

FIG. 12 is a flowchart for detailed description of the customer identification and registration process (step B31 shown in FIG. 11). In the following, steps shown in FIG. 12 having basically the same steps in FIG. 10 will be described only briefly.

First, at step C21, the CPU 21 of the camera unit 2 extracts a one-frame image of a moving image being taken. At step C22, the CPU 21 generates customer identification image data Y2 by extracting face feature point data by analyzing the extracted image (still image). At step C23 the CPU 21 searches the face recognition data file Y3 using the extracted customer identification image data Y2. If there exists registered face feature point data that coincides in features with the extracted face feature point data, that is, a match with a registered person is found (C24: yes), at step C25 the CPU 21 determines that the customer has been identified and acquires the corresponding face recognition output ID from the face recognition data file Y3. At step C30, the CPU 21 records the acquired face recognition output ID in the electronic journal file Y6. Then, the process of FIG. 12 is finished and a return is made from it.

On the other hand, if a match is not found with any registered person (C24: no), at step C26 the CPU 21 newly generates a face recognition output ID and a registration date. At step C27, the CPU 21 generates a new record which contains the face recognition output ID and the registration date. At step C28, the CPU 21 newly (additionally) registers the generated new record in the customer database Y4. At step C29, the CPU 21 additionally registers the face feature point data (customer identification image data Y2) in the face recognition data file Y3 together with the face recognition output ID. At step C30, the CPU 21 records the face recognition output ID in the electronic journal file Y6. Then, the process of FIG. 12 is finished and a return is made from it.

As described above, in the second embodiment, the customer identification and registration process of recognizing and identifying a customer is executed during registration of a transaction to the customer in the registration mode. Therefore, the customer of a transaction can be identified during registration of the transaction, which makes it possible to do a customer service on the very occasion of the transaction. For example, it becomes possible to do a service of printing a coupon on a receipt can be done after completion of a transaction depending on a customer type (e.g., whether or not the customer is a good one, which is determined on the basis of his or her past purchase results and store visit results). Furthermore, executing the customer identification and registration process during registration of a transaction is advantageous in terms of time spent and work efficiency over a single batch process which is executed later for many transactions.

In the second embodiment, customer identification image data Y2 is generated by extracting a one-frame image of a moving image being taken and extracting face feature point data by analyzing the extracted image (still image) when the subtotal key K2 is manipulated after the customer camera 25 was activated and a recording operation was started in response to a first registration manipulation of one transaction. Alternatively, customer identification image data Y2 may be generated on the basis of an image taken by activating the customer camera 25 in response to a manipulation of the subtotal key K2. In this case, customer identification image data Y2 may be generated by taking plural images consecutively in a short time (quick imaging) and selecting an image (e.g., frontal image) that is suitable for recognition from those images. This makes it unnecessary to take a moving image over a long time.

In the second embodiment, customer identification image data Y2 is generated when the subtotal key K2 is manipulated. Alternatively, customer identification image data Y2 may be generated when one of the accounting keys K3 (e.g., cash/deposit key) is manipulated. As a further alternative, customer identification image data Y2 may be generated when each of the subtotal key K2 and an accounting key K3 is manipulated. In this case, an image having a higher detection score may be employed as an image for customer identification.

In the second embodiment, customer identification image data Y2 of one transaction is generated during registration of the one transaction. Alternatively, customer identification image data Y2 may be generated during a free time (the ECR is not in operation) when no customer is waiting for registration.

In each embodiment, the ECR executes the customer identification and registration process in which customer identification image data Y2 is generated. Alternatively, the customer identification and registration process is executed in a PC (external apparatus) by storing the customer moving image file Y1, the face recognition data file Y3, the customer database Y4, and the electronic journal file Y6 in the SD card 28 in advance and inserting the SD card 28 into the PC. That is, a sales data processing apparatus may be implemented as a sales data processing system which includes an ECR and a PC.

In each embodiment, the customer camera 25 takes a moving image from the start to the end of one transaction. Alternatively, the customer camera 25 may continue taking of a moving image from switching of the mode switch MS to the registration mode to cancellation of the registration mode.

Although in each embodiment the ECR (sales data processing apparatus) is separated into the ECR main body unit 1 and the camera unit 2, the ECR main body unit 1 and the camera unit 2 may be integrated together to form an ECR. Although each embodiment is directed to the ECR as an example sales data processing apparatus, the invention may be applied to a POS terminal that is connected to a private dedicated line. Furthermore, the invention may be applied to a sales data processing system that is connected to a PC provided in headquarters via the Internet.

Each of the devices and units used in each embodiment is not limited to a one that is housed in a single cabinet and may be separated into plural units or subunits that have different functions and are housed in different cabinets. The steps of each flowchart are not limited to such as to be executed in time-series order and plural ones of them may be executed parallel or individually (or independently of each other).

Although the two embodiments of the invention have been described above, the invention is not limited to them but encompasses the concepts as defined by the claims and equivalents thereof.

What is claimed is:

1. A sales data processing apparatus which registers and processes sales data on a transaction-by-transaction basis, the apparatus comprising a non-transitory computer-readable storage medium that, when executed by a computer processor, causes the sales data processing apparatus to execute procedures, the modules comprising:
   an imaging module configured to image a customer who is waiting for registration;
   a moving image storage module configured to store a moving image taken by the imaging module by imaging the customer who is waiting for registration;
   a manipulation determination module configured to determine whether or not a prescribed one of a series of manipulations for registration of sales data of one transaction was performed;
   a generation module configured to generate customer identification image data based on an image taken by the imaging module if the manipulation determination module determines that the prescribed manipulation was performed; and
   a manipulation situation storage module configured to store data indicating manipulation timing of at least the prescribed manipulation of a series of manipulations for registration of the sales data of the one transaction,
   wherein the generation module extracts the image that was taken with the manipulation timing indicated by the data stored in the manipulation situation storage module from the moving image stored in the moving image storage module, and generates the customer identification image data based on the extracted image, and
   wherein if the extracted image that was taken with the manipulation timing indicated by the data stored in the manipulation situation storage module from the moving image stored in the moving image storage module is lower than a reference value in closeness to a complete frontal image, the generation module extracts the image based on determining the image was taken before or after the manipulation timing indicated by the data stored in the manipulation situation storage module from the moving image stored in the moving image storage and generates the customer identification image data based on the extracted image.

2. The sales data processing apparatus according to claim 1, wherein the imaging module is provided in a customer display unit to be viewed by the customer who is waiting for registration and is oriented so as to be able to squarely image the face of the customer who is waiting for registration.

3. The sales data processing apparatus according to claim 1, wherein the prescribed manipulation is a manipulation of at least one of a subtotal key to be manipulated to display, as a subtotal, a total value of sales data registered so far in the one transaction and an accounting key to be manipulated to close registration of sales data of the one transaction.

4. A sales data processing apparatus which registers and processes sales data on a transaction-by-transaction basis, the apparatus comprising a non-transitory computer-readable storage medium that, when executed by a computer processor, causes the sales data processing apparatus to execute procedures, the modules comprising:
- an extraction module configured to extract, from customer images taken by an imaging module, an image that was taken with a manipulation timing indicating a prescribed one of a series of manipulations for registration of sales data was performed; and
- a generation module configured to, if a face image value of the customer included in the extracted image is lower than a reference value in closeness to a complete frontal image, re-extract an image that was taken before or after the manipulation timing and generate customer identification image data based on the re-extracted image.

5. The sales data processing apparatus according to claim 4, further comprising:
- a manipulation situation storage module that stores, as sales record data, data relating to manipulations performed in each transaction.

6. The sales data processing apparatus according to claim 4, wherein the generation module extracts an image that was taken before or after the manipulation timing indicated by the data stored in the manipulation situation storage module from a moving image stored in the moving image storage module, and generates the customer identification image data based on the extracted image from the moving image.

7. The sales data processing apparatus according to claim 4, further comprising:
- a face recognition data storage module configured to store and manage face recognition image data of respective customers; and
- a customer identifying module configured to identify a customer by searching the face recognition data storage module based on the customer identification image data generated by the generation module.

8. The sales data processing apparatus according to claim 7, wherein the generation module generates the customer identification image data by acquiring an image taken by the imaging module by imaging the customer who is waiting for registration when the manipulation determination module determines that the prescribed manipulation was performed during registration work in which a series of manipulations for registration of sales data of the one transaction is performed; and
wherein the customer identifying module identifies the customer based on the customer identification image data generated by the generation module during the registration work.

9. The sales data processing apparatus according to claim 8, wherein the generation module generates the customer identification image data by acquiring a still image taken by activating the imaging module when the manipulation determination module determines that the prescribed manipulation was performed.

10. A non-transitory computer-readable storage medium that stores a program for causing a computer to execute procedures comprising:
- extracting, from customer images taken by an imaging module, an image that was taken with a manipulation timing indicating a prescribed one of a series of manipulations for registration of sales data was performed;
- re-extracting, if a face image value of the customer included in the extracted image is lower than a reference value in closeness to a complete frontal image, an image that was taken before or after the manipulation timing; and
- generating customer identification image data based on the re-extracted image.

* * * * *